United States Patent
Robinson et al.

(10) Patent No.: US 7,497,372 B1
(45) Date of Patent: Mar. 3, 2009

(54) SYSTEM AND METHOD FOR NEGOTIABLE INSTRUMENT CASHING INCENTIVES

(75) Inventors: Timothy L. Robinson, Reston, VA (US);
Bradford R. Schildt, Boulder, CO (US);
Tennille V. Goff, Springfield, VA (US);
Daniel J. Corwin, Ashburn, VA (US);
Timothy Neil Watson, Alexandria, VA (US)

(73) Assignee: YT Acquisition Corporation, Delray Beach, FL (US)

( * ) Notice: Subject to any disclaimer, the term of this patent is extended or adjusted under 35 U.S.C. 154(b) by 0 days.

(21) Appl. No.: 10/983,786

(22) Filed: Nov. 9, 2004

(51) Int. Cl.
*G06F 19/00* (2006.01)
(52) U.S. Cl. .................... 235/379; 235/380
(58) Field of Classification Search ............ 705/45, 705/43; 235/379, 380
See application file for complete search history.

(56) References Cited

U.S. PATENT DOCUMENTS

| | | | |
|---|---|---|---|
| 4,341,951 A | 7/1982 | Benton | |
| 5,010,485 A | 4/1991 | Bigari | |
| 5,650,604 A | 7/1997 | Marcous et al. | |
| 5,953,709 A | 9/1999 | Gilbert et al. | |
| 6,009,415 A | 12/1999 | Shurling et al. | |
| 6,105,011 A * | 8/2000 | Morrison, Jr. | 705/45 |
| 6,424,951 B1 | 7/2002 | Shurling et al. | |
| 6,488,203 B1 | 12/2002 | Stoutenburg et al. | |
| 6,536,663 B1 | 3/2003 | Lozier et al. | |
| 6,615,190 B1 | 9/2003 | Slater | |
| 6,761,309 B2 | 7/2004 | Stoutenburg et al. | |
| 2002/0082962 A1 | 6/2002 | Farris et al. | |
| 2003/0033246 A1 | 2/2003 | Slater | |
| 2003/0055782 A1 | 3/2003 | Slater | |
| 2003/0078864 A1 | 4/2003 | Hardesty et al. | |
| 2003/0093342 A1 | 5/2003 | Hilman et al. | |
| 2003/0101131 A1 | 5/2003 | Warsen et al. | |
| 2003/0233278 A1 | 12/2003 | Marshall | |

OTHER PUBLICATIONS

Loren E. Svor. A non-banked owned, automated check cashing ATM is not required to be licensed for either currency transmission or sales checks. Opinion No. 99-32. http://www.banking.state.tx.us/LEGAL/OPINIONS/99-32.HTM Jul. 2000.
Wildcard Systems, Inc. http://corporate.wildcardsystems.com/.

* cited by examiner

*Primary Examiner*—Seung H Lee
(74) *Attorney, Agent, or Firm*—Pepper Hamilton LLP

(57) ABSTRACT

A system and method of encouraging negotiable instrument cashing customers to establish accounts at financial institutions. The present invention imparts a process by which financial institutions may entice customers to open financial accounts by providing an incentive.

24 Claims, 3 Drawing Sheets

SYSTEM AND METHOD FOR NEGOTIABLE INSTRUMENT CASHING INCENTIVES

FIELD OF THE INVENTION

This application relates generally to negotiable instrument cashing transactions. More particularly, the present invention relates to a system and method for offering incentives during negotiable instrument cashing transactions.

BACKGROUND OF THE INVENTION

Generally, a financial institution charges a fee to cash negotiable instruments, particularly if the instrument is not drawn upon an account held with the institution. Because of this, many individuals refrain from cashing their negotiable instruments at financial institutions and instead employ negotiable instrument cashing merchants. While negotiable instrument cashing merchants also charge fees, customers may perceive them as superior because they have more convenient hours and provide non-financial secondary services.

Additionally, financial institutions do not gain sufficient benefit from negotiable instrument cashing transactions. Negotiable instrument cashing fees may not provide substantial profit and negotiable instrument cashing customers seldom conduct other business at the institution. What is needed is a system and method for making negotiable instrument cashing transactions worthwhile to both individuals and financial institutions.

SUMMARY OF THE INVENTION

The present invention addresses the aforementioned needs by providing a system and method for encouraging negotiable instrument cashing customers to establish accounts at financial institutions. The present invention imparts a process by which financial institutions may entice customers to open financial accounts by providing an incentive.

BRIEF SUMMARY OF THE DRAWINGS

In order to describe the manner in which the above-recited and other advantages and features of the invention can be obtained, a more particular description of the invention briefly described above will be rendered by reference to specific embodiments thereof that are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE INVENTION

Figure 1:
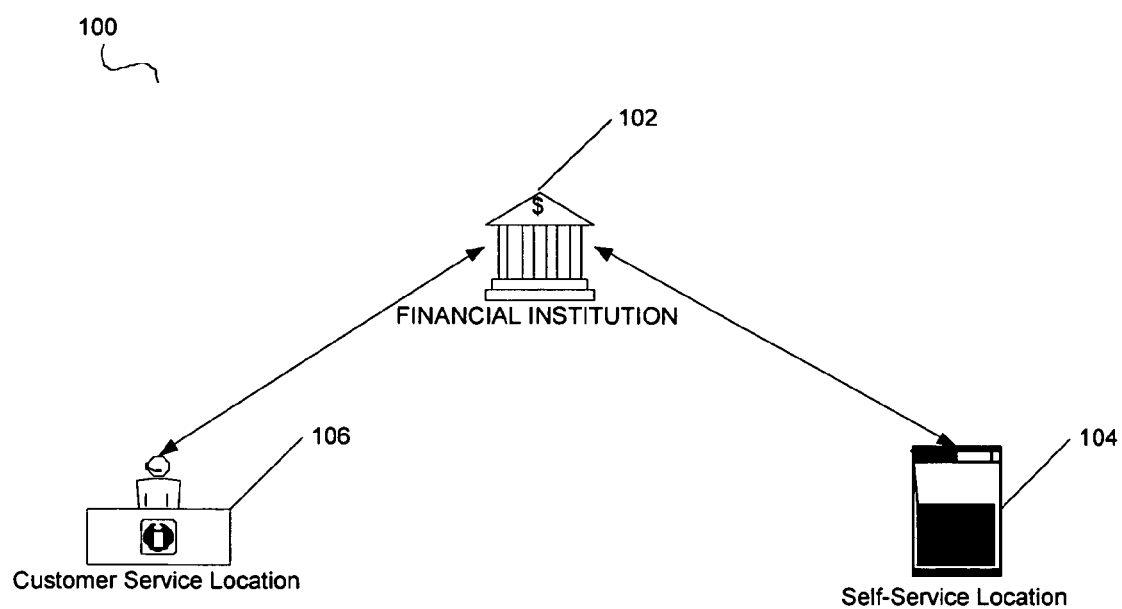
FIG. 1 illustrates a general architecture overview of a negotiable instrument cashing incentive system.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Many financial institutions are reluctant to cash negotiable instruments (NIs), such as checks, for non-account holding users. These individuals may not have a financial account of any kind or may not have an account with the present financial institution. A financial institution may be an entity that acts as an agent for providing financial services, such as a bank, a credit union, a savings association, a trust company, a credit card company, and the like. Cashing an NI received from a non-account holding user is deemed a risk because the financial institution may not be certain that the user is reputable or the NI is legitimate. Furthermore, since an NI cashing transaction is an exchange for cash, the transaction itself does not generate income for the financial institution.

Financial institutions handle these issues in various ways. In order to generate profit from such transactions, financial institutions charge service fees when cashing an NI. Furthermore, to minimize their risk, some financial institutions will only cash NIs for users if the NI being cashed is drawn on an account with the institution.

While these preventive measures allow financial institutions to make a modest profit and minimize their risk, they are not conducive to persuading users to conduct secondary business with the financial institution by opening accounts. For example, if a financial institution will not cash a user's third-party NI, the user has little reason to do business with that financial institution. Additionally, because financial institutions charge users NI cashing fees, a user may see no advantage to using a financial institution as opposed to an NI cashing merchant. In fact, because NI cashing merchants often offer more convenient hours and provide non-financial secondary services (such as selling groceries, gas, liquor, etc.), the user may view an NI cashing merchant as advantageous over a financial institution.

Thus, a financial institution may find it beneficial to offer incentives to attract users. It is a feature of the present invention that these offered incentives would also benefit the financial institution. In particular, because financial institutions obtain little revenue from NI cashing transactions, they may entice users to open accounts via a refund incentive. In one embodiment, the financial institution may offer to refund all or a part of an NI cashing fee by placing this fee in a new account for the user. Thus, the user receives a refund for the NI cashing fee and the financial institution acquires a new account. Because financial institutions seldom charge account holders for NI cashing transactions, the user may be more inclined to use the institution for subsequent NI cashing transactions. In addition, after the user establishes an account, he may be more likely to use the institution's other financial services.

FIG. 1 illustrates a general architecture overview of a negotiable instrument cashing incentive system. A user may process an NI with financial institution 102 via a service location, such as customer service location 106 or self-service location 104. Financial institution 102 may be a particular financial institution, a financial institution affiliated with a financial group, or the like. Customer service location 106 may be a staffed site, such as a teller counter, a customer service desk, or the like. Self-service location 104 may be an unmanned location, such as an automated teller machine, a kiosk, a cash dispenser, or the like. In one embodiment, a service location may include one or more a biometric input devices (BIDs) to allow for biometric authorization. A service location may be located within a building associated with financial institution 102 or may be an independent entity connected to financial institution 102.

Figure 2:
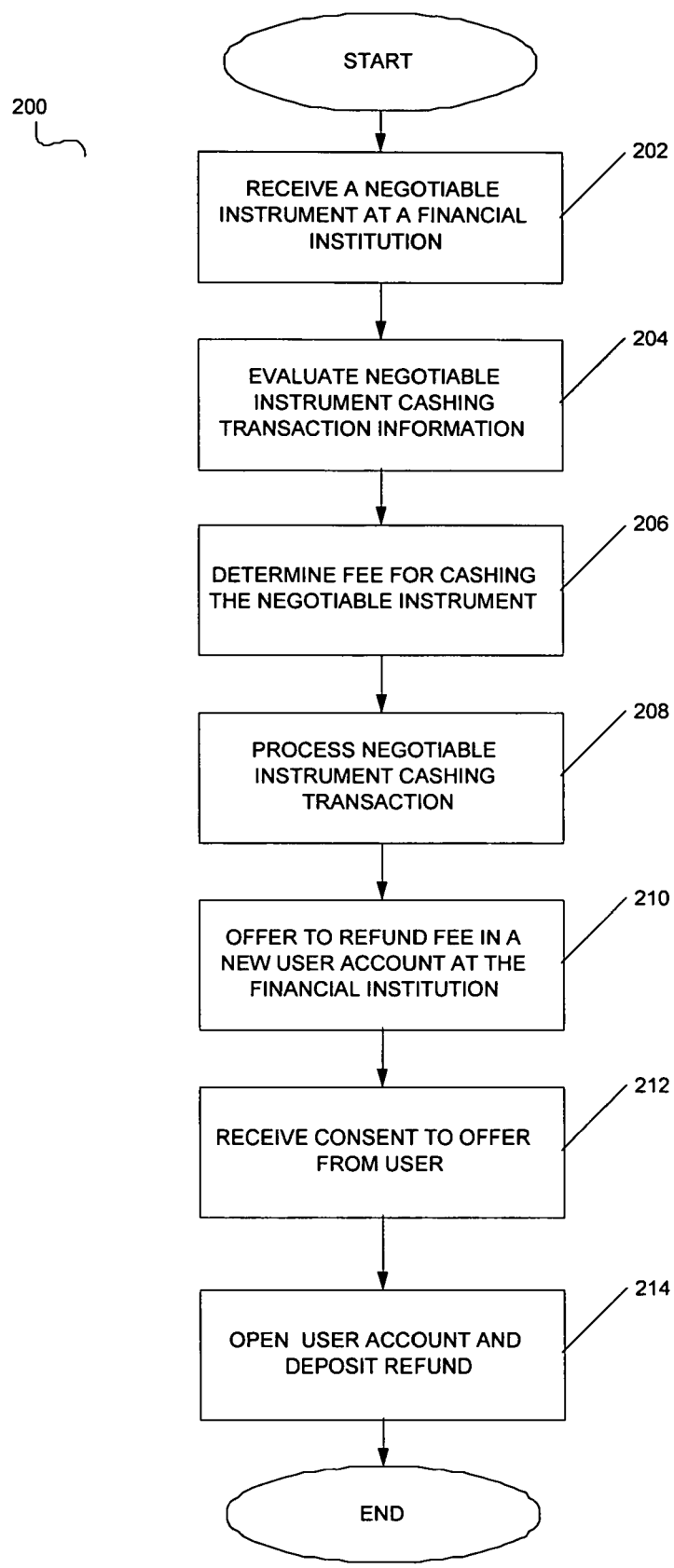
FIG. 2 illustrates a flowchart of a process for offering an incentive during a negotiable instrument cashing transaction.

FIG. 2 illustrates a flowchart of a process for offering an incentive during an NI cashing transaction. At step 202, financial institution 102 receives an NI for cashing. In one scenario, the user presents the NI at customer service location 106; in another scenario, the user presents the NI at self-service location 104.

As illustrated by step 204, in one embodiment, the system may evaluate NI cashing transaction information to determine whether system parameters are met. Depending on the embodiment, the evaluation may occur before, after, or during the NI cashing transaction or a combination thereof. The system may ensure that the NI meets certain parameters. In one scenario, the system might verify that the NI meets an amount requirement; for example, the system might only accept an NI with a value of fifty dollars or greater. In another scenario, the system may only accept an NI drawn on an account with a select number of institutions, such as those affiliated with financial institution 102 or financial institution 102 itself.

The system may also ensure a user meets certain parameters before offering an incentive. For example, in order to participate in the offer, the user may have to complete a questionnaire or agree to receive marketing material. Alternatively, the user may have to agree to perform a certain number of transactions, such as make a deposit, cash an NI, and the like, with financial institution 102. Such transactions may have particular requirements, such as occurring within a designated time period or meeting a minimum dollar amount. For example, a user may have to cash three NIs of $100.00 or more at financial institution 102 within the next three weeks to receive a NI cashing fee refund. If the user does not meet the parameters, the refund may be denied.

At step 206, the system determines the fee for the NI cashing transaction. The NI cashing fee may be generated in numerous ways; it may be a percentage based on the NI amount, a flat rate, a variable rate, or a combination thereof. For example, a financial institution may charge two dollars for every NI cashing transaction as well as a five percent of the NI amount.

At step 208, the NI cashing transaction is processed. The NI cashing process may vary per the receiving financial institution and would not limit the scope of the present invention.

In one embodiment, the NI cashing process may be conducted via biometric authorization of the user. If customer service location 106 or self-service location 104 have a BID, the user may be requested to provide biometric data. Additionally, if the transaction occurs at customer service location 106, the participating customer service representative may undergo biometric authorization.

In general, a biometric authorization refers to an authorization in which an individual provides biometric data to be matched against a biometric record in a database. As would be appreciated, the location of the database as well as the specific mechanism by which the biometric data is matched to a particular biometric record would be implementation dependent and would not limit the scope of the present invention. Thus, in a biometric authorization, the biometric data taken during the authorization can be matched against registered biometric data at a location where the registered biometric data is stored or where the authorization biometric data is gathered. In addition, biometric data received during an authorization may be tested for liveness to prevent system fraud.

Depending on the embodiment, the system may also provide a registered user with a system identification number (SID). An SID may serve as a pointer that can be used with or without user biometric data to aid the system in locating the storage location of a user record. Depending on the embodiment of the system, an SID may also serve as a user group identifier that identifies a user as an affiliate of a specified group of users.

Additionally, the principles of the present invention are not limited to using one form of biometric. For example, biometric data may represent a biometric image (or sample) and/or a mathematical representation of the biometric image, often referred to as a biometric "template." In one example, a biometric template can represent any data format that includes feature, positional, or other representing information of characteristics of biometric data. Alternatively, a template may be a mathematical representation of more than one biometric. For example, a template may be generated from biometric data acquired from two individual fingers, such as a thumb and index finger, or from a finger and an iris scan. The biometric data may include fingerprint data, iris data, facial data, voice data, retinal data, hand architecture data, DNA data, or any other physical measurement pertaining to one's person.

At step 210, the system offers to refund the NI cashing fee to the user by placing the refund in a new account under the user's name. The account may be established by the user or the system. The refund may be a portion of the NI cashing fee, such as the total fee or a partial amount. If the user has previously conducted NI cashing transactions with financial institution 102 and financial institution 102 has maintained a record of these transactions, the refund may include an amount associated with prior NI cashing fees.

The offer may be presented in numerous manners. In one scenario, the offer may be verbally proposed to the user by a customer service representative, via a recorded message, or the like. In another scenario, the offer may be provided in paper or electronic form to the user. The user may be asked to complete the form during the transaction or may be allowed to complete it later. For example, a bank clerk may provide a user with a paper form or the form may print out from an ATM. The user may take the form with him and later return it to the financial institution 102, either via mail, fax, or in person. In another embodiment, the form may be emailed to the user. The user may complete the form electronically and return it via email or the user may complete the form via a web site. Alternatively, the user may print the emailed form, manually complete it, and return it to financial institution 102 via postal service, fax, or by hand.

In order to entice a user further and to demonstrate the value of the incentive, the system may provide the user with documentation illustrating the NI cashing fee amount. In one scenario, the amount stated on the receipt would reflect the refund the user would receive by accepting the incentive. During an NI cashing transaction, the user may receive a receipt that states how much money he would receive if he opened an account. The receipt may show information pertaining to the present transaction or, if financial institution 102 maintains a record of non-account holding user NI cashing transactions, the receipt may list the cumulative amount the user has spent in NI cashing fees. In one embodiment, the documentation may also serve as the incentive offer and may double as an offer form.

In one embodiment, in order to receive the incentive, a user may refer one or more individuals to financial institution 102. Alternatively, the user may refer another individual to financial institution 102 in order to receive an enhanced benefit, such as a larger refund, or to obtain an additional reward, such as free checks. The user may bring an individual with him during the NI cashing transaction and both may participate concurrently. In another scenario, the user may receive an incentive coupon during an NI cashing transaction and then provide this coupon to another individual, granting the individual the opportunity to participate in the offer. The referring user may be identified by information on the coupon, such as a reference number or the user's name. Alternatively, the referred individual may verbally acknowledge the user.

At step 212, the system receives the user's consent to the offer. Consent may be necessary to complete the NI cashing transaction or participation in the offer may be voluntary. In one embodiment, the user may have a limited time to agree to the incentive offer before it expires and the refund is forfeited. For example, during an NI cashing transaction, a user may receive the offer. In order to receive the refund, the user may have to open an account with financial institution 102 within sixty days.

The system may receive the user's consent in a variety of ways. The user may consent to the offer verbally, such as to a customer service representative or to a recording device. Alternatively, the user may sign a paper or electronic form. The user's signature may be a physical signature or may be accomplished through electronic means, such as by selecting "Yes" to an agreement on a computer screen or by providing biometric data at a BID. If the NI cashing transaction is conducted through biometric authorization, the user's biometric data may be used to authorize both the transaction as well as consent to the offer. The user's consent to the offer may be stored in the user's account record, along with other identifying data and financial information.

At step 214, after receiving the user's consent to the offer, an account is opened in the user's name at financial institution 102 and the system deposits the NI cashing fee refund within the newly-opened account. The type of account may be specified by the offer, may be stipulated by the user, or may be determined by the system.

Figure 3:
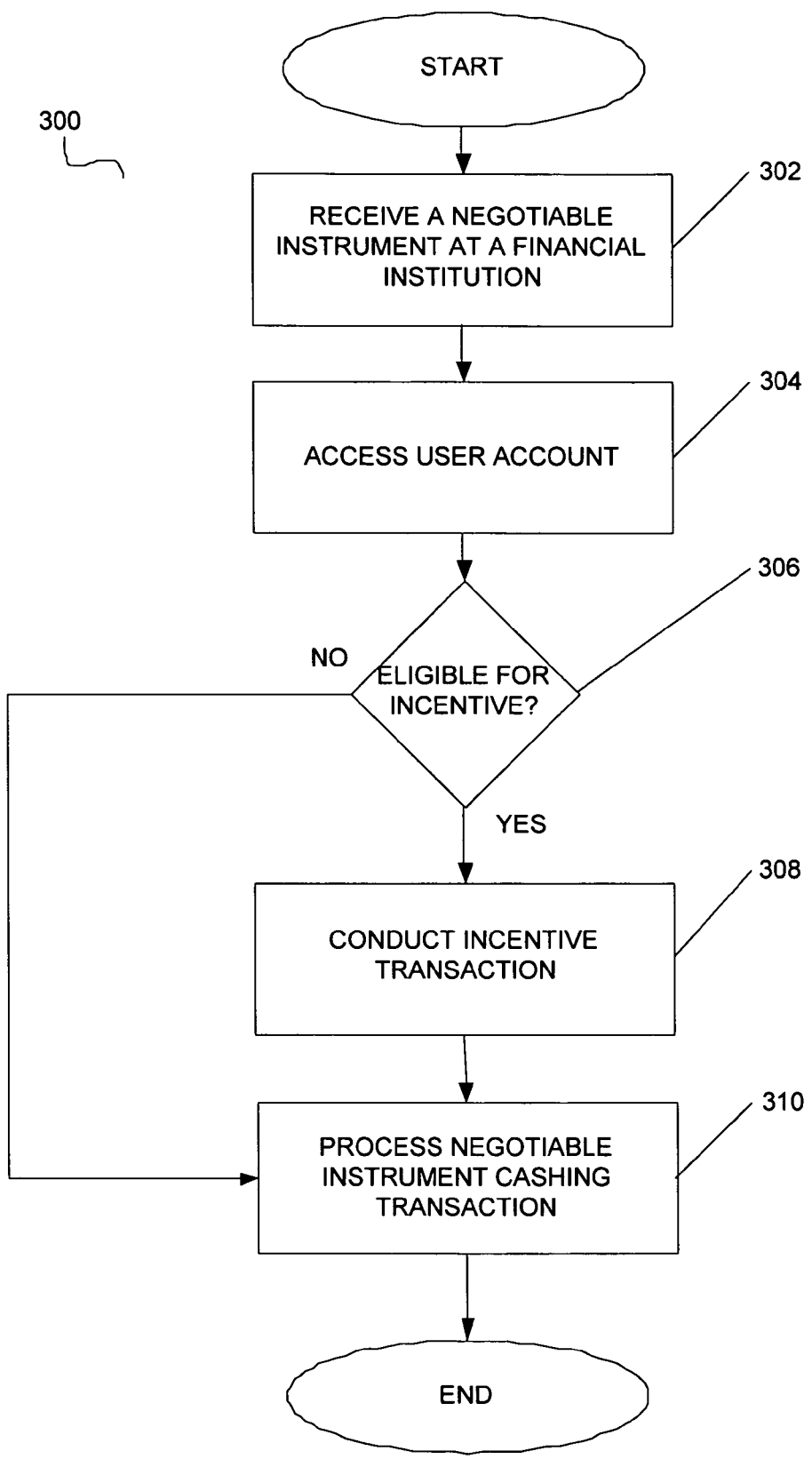
FIG. 3 illustrates a flowchart of a process for conducting an incentive transaction during a negotiable instrument processing transaction.

As an additional enticement to encourage NI cashing users to open accounts, a financial institution may offer other incentives subsequent to account activation. FIG. 3 illustrates a flowchart of a process for conducting an incentive transaction during an NI processing transaction. At step 302, the system receives an NI, such as a check, from a user for the purpose of processing, such as for cashing or depositing. Depending on the embodiment, the NI may or may not be drawn on an account held with the financial institution.

At step 304, the system accesses the user's account record with financial institution 102. Information stored in the user's account record may stipulate whether or not the user is eligible for additional incentives. At step 306, based upon information stored within the user's account record, the system determines if the user is eligible for the additional incentive. Eligibility may be determined by user biometric authorization, user offer consent, user transaction history (including the user's standing with financial institution 102), offer parameters, the amount of the NI being processed, the amount of cash to be dispensed or deposited, and the like.

If the user is determined ineligible for an incentive transaction, the system processes the NI processing transaction normally, at step 310, accepting or denying the transaction as would be determined by implementation. If the user is determined to be eligible for an incentive, the system may conduct the incentive transaction at step 308.

The incentive transaction may vary depending on the particular embodiment. In one scenario, the user will receive a deposit in the account that was opened upon receipt of the user's consent to the incentive offer. The amount of the deposit may be equivalent to an NI cashing fee that would be applied if the user did not have an account. In another scenario, the amount of the deposit may be a set value offered and established at the time of the user's acceptance of the incentive offer. Incentive transactions may be effective for a variety of time periods, such as a limited time, for the duration of the account, as long as the account meets a minimum balance requirement, or the like.

In order to prevent unscrupulous users from defrauding the system, system parameters may limit the number of incentive transactions. For example, to prevent a user from writing NIs to himself and cashing them to receive a refund multiple times, an incentive transaction may be only valid for third-party NIs. Alternatively, the system may allow the user to conduct a limited number of financial transactions or limit the number of incentive transactions. For example, a user may only be eligible for three incentive transactions a month.

As noted, at step 308, the incentive transaction is conducted as stipulated by the offer. The NI processing transaction would then be processed at step 310. The particulars of the NI processing are implementation dependent and would not limit the scope of the present invention. In one embodiment, the NI processing may be conducted via biometric authorization of the user. Additionally, if the transaction occurs at a manned location, such as a teller counter, the participating customer service representative may undergo biometric authorization.

In an additional embodiment, as part of the incentive offer, financial institution 102 may make periodic deposits in the user's account. In one scenario, the amount of deposit may be associated with an NI cashing fee. In another scenario, the deposits are made at a predetermined time interval. The frequency, amount, and duration of the deposits may be determined by system parameters, such as a time limit, the user's account status, and a minimum balance requirement. For example, a user may receive a monthly deposit from financial institution 102 equal to the highest NI cashing fee he would have been charged that month had the user not had an account. The user may only be eligible for this deposit if he meets a minimum balance requirement for that month.

In an additional embodiment, transaction information transferred in the system may be encrypted. For example, information may be encrypted at one point and sent across a non-secure connection between points or not encrypted at a point of communication and sent to the other point of communication across a secure connection. Encryption and decryption of these messages may be monitored by services provided by a security company such as VeriSign. In one scenario, as an added level of security, information internal to a terminal and which is never transmitted may also be encrypted. This prevents retrieval of sensitive information (e.g., biometric data) from a stolen terminal. In an additional embodiment, the system incorporates one or more anti-tampering methods by which to recognize authentic and non-authentic system requests.

The present invention may function with third-party institutions in addition to financial institutions. A third-party may present the aforementioned offer by serving as an intermediary between a financial institution and a user. For example, in order to encourage unbanked individuals to open financial accounts, an aid organization may offer to cash an NI, open a financial account upon an individual's behalf, and refund the cashing fee in the new account. In another illustration, a third-party may present the offer to encourage individuals to register to vote. The third-party may offer to place an NI cashing fee refund into a user's account if the user agrees to register to vote. The system may receive proof of this registration before opening the account. Alternatively, an NI cashing merchant may offer to refund an NI cashing fee by offering the fee amount in a store-credit account.

A method of providing incentives during a negotiable instrument cashing transaction has been illustrated. It will be appreciated by those skilled in the art that the method of the present invention can be used to entice non-account-holding users to establish financial accounts at a financial institution. It will thus be appreciated by those skilled in the art that other variations of the present invention will be possible without departing from the scope of the invention disclosed.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention. Therefore, the above description should not be considered to be exclusive of these other embodiments. Also, it is to be understood that the phraseology and terminology employed herein are for the purposes of description and should not be regarded as limiting.

What is claimed is:

1. A method for establishing a deposit account, the method comprising:
    at a financial institution, receiving a request from a user to cash a negotiable instrument;
    processing said request by a negotiable instrument cashing system, said processing including electing to charge a fee for processing said negotiable instrument;
    determining, by the negotiable instrument cashing system, if said user is eligible for an offer to establish a deposit account with said financial institution, wherein determining if said user is eligible comprises determining whether one or more parameters are satisfied;
    if said user is eligible, presenting said offer to establish a deposit account with said financial institution to said user, wherein said offer includes depositing an amount equal to at least a portion of said fee into said deposit account; and
    receiving user consent to said offer and opening said deposit account.

2. The method of claim 1, further comprising transmitting information in an encrypted format.

3. The method of claim 1, wherein said negotiable instrument is drawn on an account held with said financial institution.

4. The method of claim 1, wherein said processing is based upon biometric authorization of said user.

5. The method of claim 1, wherein said determining if said user is eligible is based upon one or more of user biometric authorization, user offer consent, user transaction history, offer parameters, negotiable instrument amount, and dispensed cash amount.

6. The method of claim 1, further comprising providing said user with documentation of said fee.

7. The method of claim 1, further comprising providing said user with documentation of fees for one or more of said user's prior negotiable instrument cashing transactions.

8. The method of claim 1, wherein said financial institution is one of a bank, a credit union, a savings association, a trust company, and a credit card company.

9. The method of claim 1, wherein said offer is available for a limited time.

10. The method of claim 1, further comprising cashing said negotiable instrument, said cashing being conditioned on said user consenting to said offer.

11. The method of claim 1, wherein said offer includes depositing an additional amount into said deposit account.

12. The method of claim 1, wherein said offer includes depositing an amount in said deposit account at one or more subsequent events.

13. The method of claim 12, wherein said depositing is restricted to events that occur during a predetermined time interval.

14. The method of claim 12, wherein said event is a negotiable instrument cashing transaction.

15. The method of claim 14, wherein said amount is equal to a portion of a fee for said negotiable instrument cashing transaction.

16. The method of claim 1, wherein the duration of said offer is determined by one or more system parameters.

17. The method of claim 16, wherein said system parameter is one or more of a time limit, an account status, and a minimum balance.

18. The method of claim 1, wherein said receiving user consent occurs during said processing.

19. The method of claim 1, wherein said receiving user consent occurs subsequent to said processing.

20. The method of claim 1, wherein said user consent is receipt of user biometric data.

21. The method of claim 1, further comprising presenting said offer to one or more individuals referred by said user.

22. The method of claim 21, wherein said user receives a benefit for said referral.

23. The method of claim 21, wherein said individual receives a coupon pertaining to said offer.

24. The method of claim 23, wherein said coupon references said user.

* * * * *